(12) United States Patent
Pan et al.

(10) Patent No.: US 12,474,897 B2
(45) Date of Patent: Nov. 18, 2025

(54) CODE EXECUTION METHOD AND DATA PROCESSING DEVICE AND SYSTEM (71) Applicant: Montage Technology Co., Ltd., Shanghai (CN)

(72) Inventors: Yong Pan, Shanghai (CN); Kang Xu, Shanghai (CN)

(73) Assignee: Montage Technology Co., Ltd., Shanghai (CN)

( * ) Notice: Subject to any disclaimer, the term of this patent is extended or adjusted under 35 U.S.C. 154(b) by 197 days.

(21) Appl. No.: 18/502,085

(22) Filed: Nov. 6, 2023

(65) Prior Publication Data

US 2024/0201960 A1    Jun. 20, 2024

(30) Foreign Application Priority Data

Dec. 16, 2022  (CN) .......................... 202211631248.9

(51) Int. Cl.
*G06F 8/35* (2018.01)
*G06F 8/41* (2018.01)

(52) U.S. Cl.
CPC ................ *G06F 8/35* (2013.01); *G06F 8/427* (2013.01)

(58) Field of Classification Search
CPC ....................................................... G06F 8/35
See application file for complete search history.

(56) References Cited

U.S. PATENT DOCUMENTS

| | | | | |
|---|---|---|---|---|
| 7,962,684 B2* | 6/2011 | Struk | .................... | G06F 12/123 |
| | | | | 711/159 |
| 9,678,775 B1* | 6/2017 | Grover | .................. | G06F 9/4843 |
| 10,558,580 B2* | 2/2020 | Petkov | ...................... | G06F 1/24 |
| 10,572,390 B2* | 2/2020 | Petkov | .................. | G06F 3/0626 |
| 11,182,221 B1* | 11/2021 | Sivaramakrishnan | .. | G06F 30/34 |
| 11,580,031 B2* | 2/2023 | Shwartsman | ....... | G06F 9/30145 |
| 11,809,750 B1* | 11/2023 | Pamoti | ................ | G06F 12/0246 |

(Continued)

FOREIGN PATENT DOCUMENTS

| CN | 113050990 A | * | 6/2021 | ......... G06F 9/30038 |
|---|---|---|---|---|
| WO | WO-2019077607 A1 | * | 4/2019 | ............. G06F 8/658 |

OTHER PUBLICATIONS

Chang, Andre Xian Ming. Compiler for a Trace-Based Deep Neural Network Accelerator. Diss. Purdue University Graduate School, 2021.*

*Primary Examiner* — Francisco J Aponte
(74) *Attorney, Agent, or Firm* — JCIPRNET (57) ABSTRACT A code execution method and a data processing device and system are provided. The method includes storing, through a data processing device, multiple executable files corresponding to multiple functions and multiple call information obtained by parsing a target model through a compile into a main memory and running, through the data processing device, the target model. The running, through the data processing device, the target model includes the following: loading an executable file from the main memory into an application code area of a local memory based on a running sequence of a plurality of functions and loading corresponding call information into a stack area of the local memory; and running the executable file in the application code area based on the call information in the stack area and transferring a running result from the local memory to the main memory after the running is completed.

13 Claims, 8 Drawing Sheets (56) References Cited

U.S. PATENT DOCUMENTS

| | | | | |
|---|---|---|---|---|
| 11,868,777 | B2* | 1/2024 | Kalamatianos | G06F 9/52 |
| 12,112,199 | B2* | 10/2024 | Schneider | H03M 7/6005 |
| 12,210,468 | B2* | 1/2025 | Goel | G06F 13/1642 |
| 12,271,322 | B2* | 4/2025 | Kachare | G06F 13/4027 |
| 2019/0042925 | A1* | 2/2019 | Choe | G06N 3/063 |
| 2019/0138308 | A1* | 5/2019 | Robinson | G06F 9/30036 |
| 2019/0163454 | A1* | 5/2019 | Osman | G06F 3/0634 |
| 2019/0377580 | A1* | 12/2019 | Vorbach | G06F 9/30123 |
| 2020/0201932 | A1* | 6/2020 | Gradstein | G06F 9/3851 |
| 2022/0197709 | A1* | 6/2022 | Sivaramakrishnan | G06F 11/2236 |
| 2022/0206989 | A1* | 6/2022 | Ould-Ahmed-Vall | G06F 9/30043 |
| 2023/0281042 | A1* | 9/2023 | Khinvasara | G06N 5/04 718/104 |
| 2024/0143502 | A1* | 5/2024 | Dechene | G06F 9/3836 |

* cited by examiner

CODE EXECUTION METHOD AND DATA PROCESSING DEVICE AND SYSTEM

CROSS-REFERENCE TO RELATED APPLICATION

This application claims the priority benefit of China application serial no. 202211631248.9, filed on Dec. 16, 2022. The entirety of the above-mentioned patent application is hereby incorporated by reference herein and made a part of this specification.

BACKGROUND

Technical Field

The disclosure relates to the fields of artificial intelligence and big data, and in particular, relates to a code execution method and a data processing device and system.

Description of Related Art

In embedded systems of system on a chip (SOC), in order to reduce memory access latency, local memory (such as static random access memory (SRAM)), for example, is usually used most of the time to load program codes and data. However, the size of local memory in an embedded system is limited due to cost and power consumption constraints. With the rapid development of artificial intelligence and big data, its related algorithms are also changing rapidly, and the functions/operators that are used are unpredictable. Further, as the codes corresponding to the algorithms increase, the required storage space is getting larger and larger, so the limited storage space of local memory can no longer match its rapidly growing storage needs. Therefore, in the condition that the function/operator is unpredictable or/and the amount of codes exceeds the size of the local memory, how to allow codes to be stored in the local memory has become an urgent problem to be solved.

SUMMARY

The disclosure relates to a code execution method and a data processing device and system capable of flexibly storing code segments and data segments of a target model onto a local memory.

An embodiment of the disclosure provides a code execution method, and the method includes the following steps. A data processing device stores a plurality of executable files corresponding to a plurality of functions and a plurality of call information obtained by parsing a target model through a compiler in a host computer into a main memory. The data processing device includes the main memory and a local memory, and the local memory includes an application code area and a stack area. The data processing device runs the target model. The data processing device running the target model includes the following steps. An executable file among the plurality of executable files is loaded from the main memory into the application code area based on a running sequence of the plurality of functions, and call information among the plurality of call information corresponding to the executable file loaded into the application code area is loaded into the stack area. The executable file loaded into the application code area is run based on the call information loaded into the stack area. After the running is completed, a running result is transferred from the local memory to the main memory.

In the code execution method according to an embodiment of the disclosure, the application code area is divided into a first buffer area and a second buffer area, and the stack area is divided into a first stack area and a second stack area. The data processing device running the target model further includes the following steps. Based on the running sequence, a first executable file among the plurality of executable files is loaded from the main memory into the first buffer area, and first call information among the plurality of call information corresponding to the first executable file is loaded into the first stack area. The first executable file stored in the first buffer area is run based on the first call information stored in the first stack area, and during a running period of the first executable file, a second executable file among the plurality of executable files is loaded from the main memory into the second buffer area, and second call information among the plurality of call information corresponding to the second executable file is loaded into the second stack area. After the first executable file is finished running, the second executable file stored in the second buffer area is run based on the second call information stored in the second stack area.

In the code execution method according to an embodiment of the disclosure, the data processing device running the target model further includes the following steps. During a running period of the second executable file, a third executable file among the plurality of executable files is loaded and overwritten from the main memory into the first buffer area and third call information among the plurality of call information corresponding to the third executable file is loaded and overwritten into the first stack area. After the running of the second executable file is finished, the third executable file stored in the first buffer area is run based on the third call information stored in the first stack area.

In the code execution method according to an embodiment of the disclosure, the local memory further includes a firmware area for storing firmware. The executable file loaded into the application code area being run based on the call information loaded into the stack area further includes the following step. The firmware runs the executable file loaded into the application code area based on the call information loaded into the stack area.

In the code execution method according to an embodiment of the disclosure, the firmware is a dynamic overlay manager. Before the data processing device runs the target model, the method further includes the following step. The dynamic overlay manager is loaded into the firmware area.

In the code execution method according to an embodiment of the disclosure, the data processing device running the target model further includes the following steps. A first direct memory access (DMA) engine provided to the firmware loads the executable file and the call information from the main memory to the local memory. A second DMA engine provided to the firmware transfers the running result from the local memory to the main memory.

In the code execution method according to an embodiment of the disclosure, the target model is an artificial intelligence model, each of the executable files includes a code segment and a data segment corresponding to each function, and each call information includes a call variable corresponding to each code segment.

An embodiment of the disclosure further provides a data processing device including a main memory, a local memory, and a processor. The main memory stores a plurality of executable files corresponding to a plurality of functions and a plurality of call information obtained by parsing a target model through a compiler in a host computer. The local memory includes a stack area and an application code area. The processor is configured to: load an executable file among the plurality of executable files from the main memory into the application code area based on a running sequence of the plurality of functions and load call information among the plurality of call information corresponding to the executable file loaded into the application code area into the stack area, run the executable file loaded into the application code area based on the call information loaded into the stack area, and transfer a running result from the local memory to the main memory after the running is completed.

An embodiment of the disclosure further provides a data processing system including a host computer and the above-mentioned data processing device. The host computer obtains a plurality of executable files corresponding to a plurality of functions and a plurality of call information by parsing a target model through a compiler.

To sum up, in the disclosure, the code segments and the data segments of the target model may be flexibly placed on the local memory in the data processing device without limiting the software/hardware scale. Compared to the conventional solutions, a balance of flexibility and performance is achieved and improved.

BRIEF DESCRIPTION OF THE DRAWINGS

FIG. 6A to FIG. 6C are schematic graphs of an access mechanism under the double buffer architecture according to an embodiment of the disclosure.

DESCRIPTION OF THE EMBODIMENTS

Descriptions of the disclosure are given with reference to the exemplary embodiments illustrated by the accompanying drawings. Wherever possible, the same reference numbers are used in the drawings and the description to refer to the same or like parts.

Figure 1:
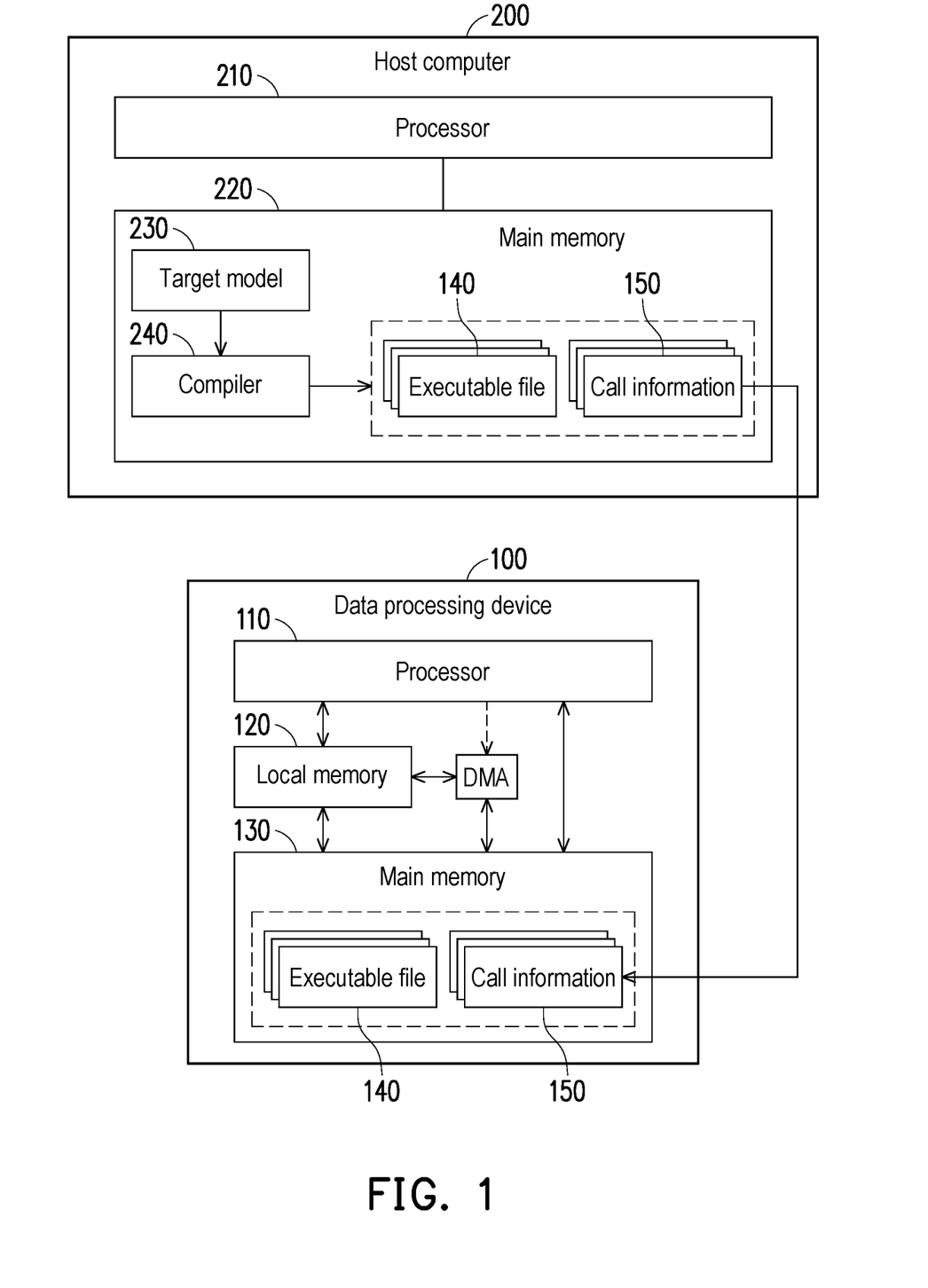
FIG. 1 is a block diagram integrating a data processing device and a host computer according to an embodiment of the disclosure.

FIG. 1 is a block diagram of a data processing device and a host computer according to an embodiment of the disclosure. With reference to FIG. 1, a data processing device 100 may be a computing acceleration device. A host computer 200 and the data processing device 100 may be connected through a peripheral component interconnect express (PCIe) bus, for example, and the data processing device 100 may accelerate processing of a computing task to improve computing efficiency. In some embodiments, the host computer 200 may be implemented by any electronic apparatus with computing and data transmission functions. For instance, the host computer 200 may be a personal computer, a tablet computer, or the like.

In an embodiment, the data processing device 100 may include a processor 110, a local memory 120, and a main memory 130. The processor 110 may be, for example, a central processing unit (CPU), a physics processing unit (PPU), a programmable microprocessor, an embedded controller, a digital signal processor (DSP), an application specific integrated circuit (ASIC), or other similar devices.

The local memory 120 may be implemented using a static random access memory (SRAM). The main memory 130 may be a double data rate (DDR) memory, fixed or removable random access memory (RAM), read-only memory (ROM), flash memory or other similar devices, or a combination of these devices.

The local memory 120 of the data processing device 100 has a smaller capacity but a faster exchange speed than the main memory 130. The processor 110 may load data to be accessed from the main memory 130 into the local memory 120 in a short period of time to speed up reading.

The host computer 200 may include a processor 210 and a main memory 220. The processor 210 may be implemented using a CPU, a PPU, a programmable microprocessor, an embedded controller, a DSP, an ASIC, or other similar devices. The main memory 220 is similar to the main memory 130 and may be implemented using a DDR memory.

The host computer 200 further includes a compiler 240. A target model 230 to be run, executable files 140, and call information 150 are stored in the main memory 220. In the host computer 200, the processor 210 controls the compiler 240 to parse the target model 230 and thereby obtains the executable files 140 corresponding to a plurality of functions and the call information 150. The compiler 240 translates source codes of the target model 230 into low-level machine language programs that a computer can interpret and run, that is, the executable files 140. Each executable file 140 includes a code segment (e.g., a ".text" file) corresponding to an operator and a data segment (e.g., a ".data" file). One code segment represents an instruction of an operator or a function. The data segment includes initialized data, such as an initialized global variable, a constant, a global static variable, and a local static variable. Further, the compiler 240 is further configured to dump a call variable corresponding to each code segment into the call information 150 and output it. The call variable in the call information 150 is, for example, stack area information, including a local variable, a parameter, and a return value of the operator (or function). The operator is the smallest element in the AI model and can also be mapped to the concept of "function (callee)", which is uniformly expressed as "function" in the following paragraphs. One function corresponds to one code segment, one data segment, and one call information.

Figure 2:
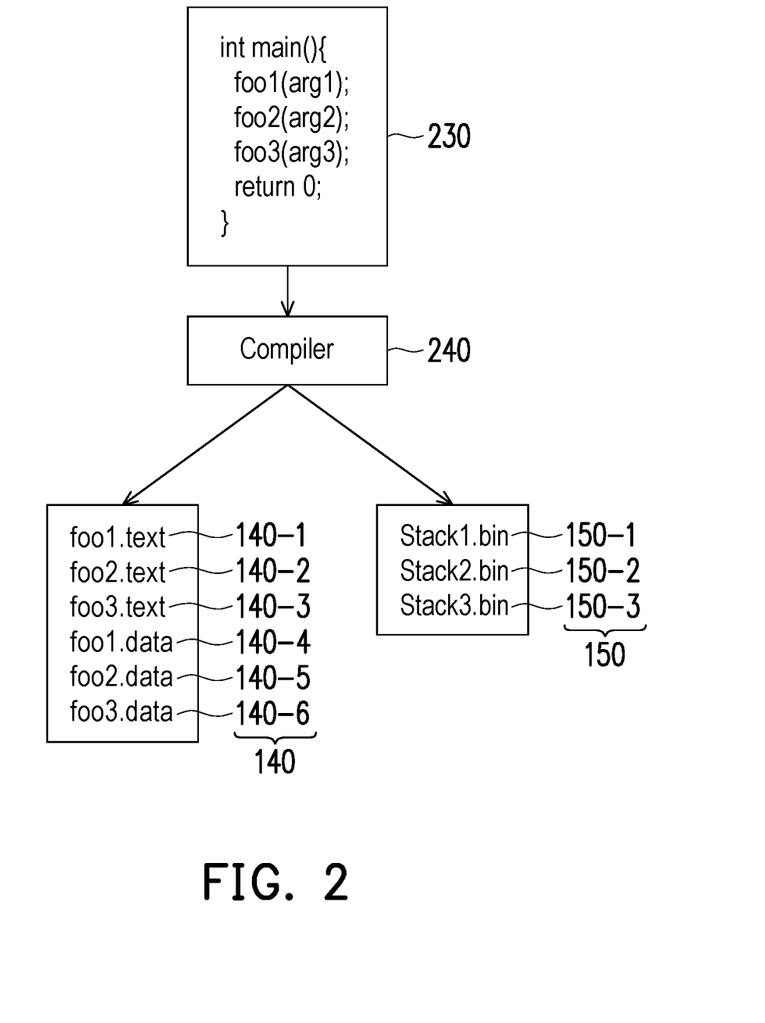
FIG. 2 is a schematic graph of a model compilation process of a compiler according to an embodiment of the disclosure.

FIG. 2 is a schematic graph of a model compilation process of a compiler according to an embodiment of the disclosure. With reference to FIG. 2, taking the target model 230 including three functions (foo1, foo2, and foo3) as an example, the compiler 240 parses the target model 230 and obtains the executable files 140 corresponding to the three functions (including code segments 140-1 to 140-3 and data segments 140-4 to 140-6) and call information 150-1 to 150-3 corresponding to the three functions. Herein, the function foo1 corresponds to the code segment 140-1, the data segment 140-4, and the call information 150-1. The function foo2 corresponds to the code segment 140-2, the data segment 140-5, and the call information 150-2. The function foo3 corresponds to the code segment 140-3, the data segment 140-6, and the call information 150-3. It should be noted that the code segments 140-1 to 140-3 are mapped to a same address through the overwrite technique, so there will be no code segment running at the same time. That is, the code segments 140-1 to 140-3 have a sequential relationship when being run.

Herein, the compiler 240 is configured to dump stack data as the call information 150 when a caller is ready and before jumping to a callee. Further, when parsing the target model, the compiler 240 also obtains a running sequence of the functions (i.e., the calling/processing sequence of the functions), and embodies the running sequence in the call information 150 corresponding to each function. In this way, the caller may learn the running sequence of the functions based on the call information 150 and then loads the call information 150, the executable files 140, etc. corresponding to the functions in sequence according to the running sequence. In an embodiment, a file name of the call information 150 may be used to reflect the running sequence of the functions. For instance, in FIG. 2, the call information 150 of the function foo1 that is run first is named 150-1, the call information 150 of the function foo2 that is run second is named file 150-2, and so on. In this way, the caller may know the running sequence of the functions based on the file name of the call information 150. However, the disclosure is not limited thereto, and the running sequence of the functions may also be indicated in other suitable ways. After the compiler 240 parses the target model 230 to generate the executable files 140 and the call information 150, the host computer 200 transfers the executable files 140, the call information 150, etc. from the main memory 220 to the main memory 130 of the data processing device 100 and notifies the data processing device 100.

After being notified, the data processing device 100 loads the executable files 140, the corresponding call information 150, etc. from the main memory 130 to the local memory 120 according to the running sequence of the functions and moves a running result from the local memory 120 to the main memory 130 after the running is completed.

Figure 3:
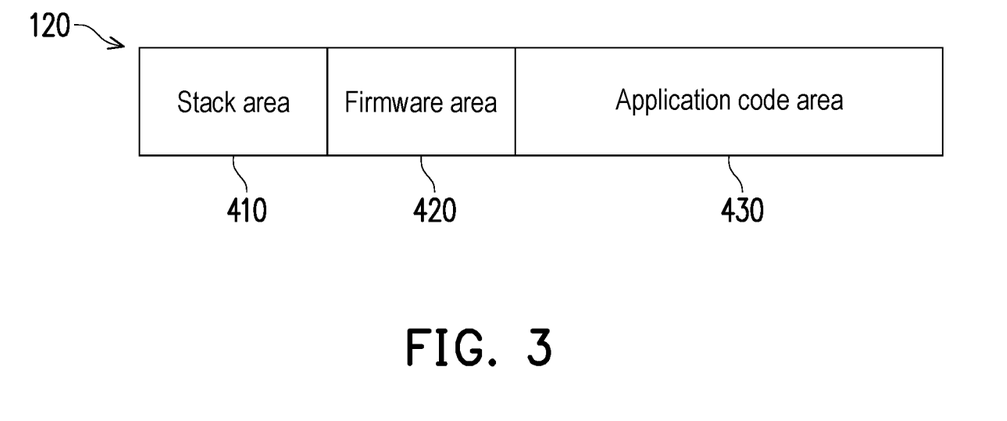
FIG. 3 is an architectural schematic graph of a local memory according to an embodiment of the disclosure.

FIG. 3 is an architectural schematic graph of the local memory 120 in the data processing device 100 according to an embodiment of the disclosure. With reference to FIG. 3, the local memory 120 includes a stack area 410, a firmware area 420, and an application code area 430. The stack area 410 is used to store the call information 150, the application code area 430 is used to store the executable files 140, the running result, etc., and the firmware area 420 is used to store firmware. For instance, in the case where the local memory 120 is implemented by using 256 KB SRAM, 32 KB may be allocated to the stack area 410, 32 KB may be allocated to the firmware area 420, and 192 KB may be allocated to the application code area 430. After the data processing device 100 is booted, a dynamic overlay manager is loaded as firmware from a flash memory to the firmware area 420. The processor 110 controls the running of a code by executing the firmware in the firmware area 420.

The dynamic overlay manager is added to the firmware, so that the dynamic overlay manager manages the data transfer from the main memory 130 to the local memory 120 before each function is run. Further, after the running of each function has finished, the dynamic overlay manager manages the data movement from the local memory 120 to the main memory 130.

The dynamic overlay manager manages the data transfer between the main memory 130 and the local memory 120 by configuring direct memory access (DMA) engine(s). For instance, the dynamic overlay manager loads the data in the main memory 130 to the local memory 120 by configuring a first DMA engine and moves the data in the local memory 120 to the main memory 130 by configuring a second DMA engine. Moreover, the dynamic overlay manager is also responsible for calling functions. The sequence in which the dynamic overlay manager calls the functions, that is, the sequence in which the functions are run, may be obtained from the call information 150 corresponding to the functions.

Figure 4:
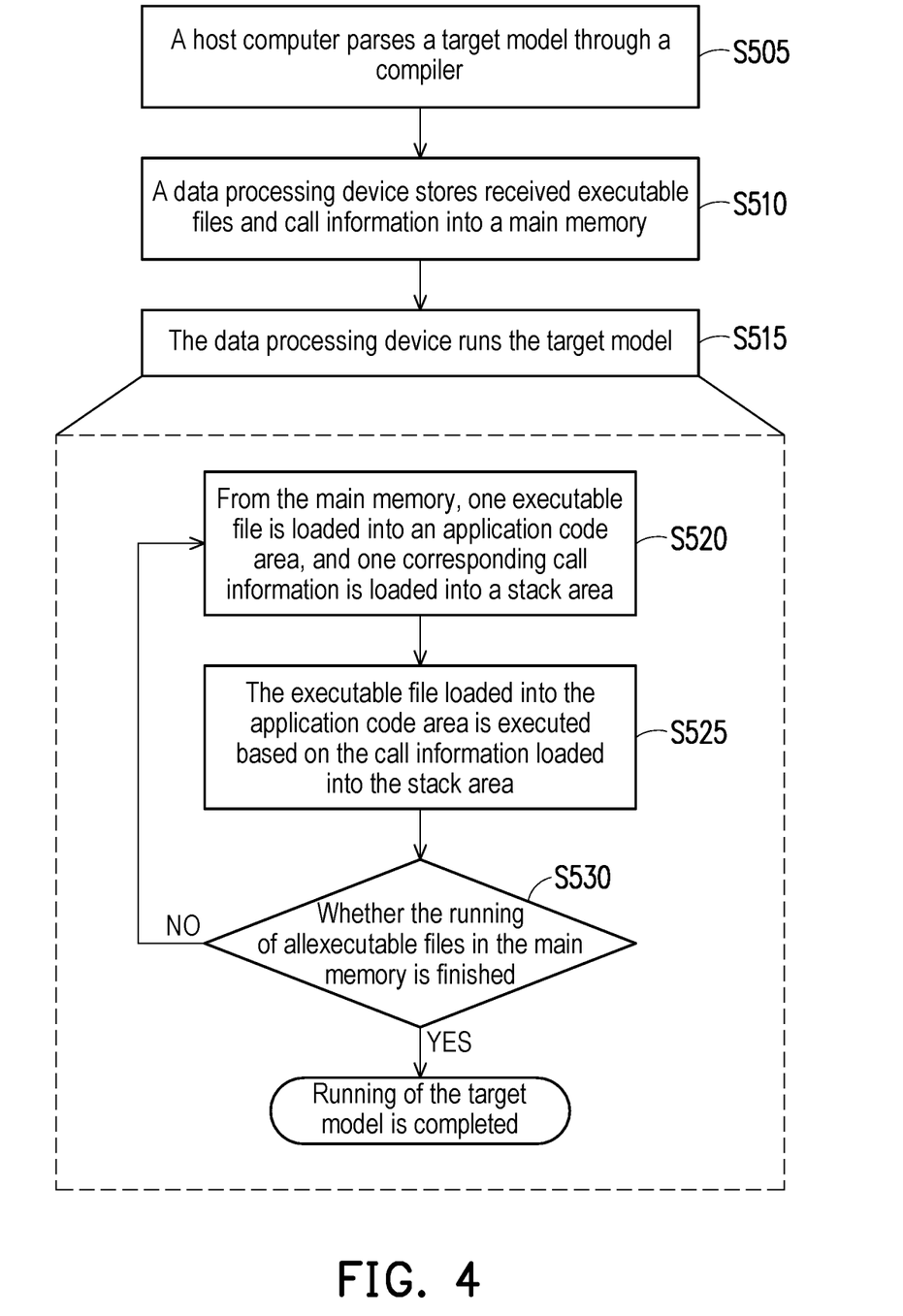
FIG. 4 is a flow chart of a code execution method according to an embodiment of the disclosure.

FIG. 4 is a flow chart of a code execution method according to an embodiment of the disclosure. With reference to FIG. 4, first, in step S505, the processor 210 of the host computer 200 parses the target model 230 through the compiler 240 and obtains the executable files 140 and the call information 150. Thereafter, the host computer 200 transmits the executable files 140 and the call information 150 to the data processing device 100.

In step S510, the data processing device 100 stores the received executable files 140 and the call information 150 into its main memory 130. Next, in step S515, the data processing device 100 runs the target model 230. To be specific, the processor 110 of the data processing device 100 controls the firmware in the firmware area 420 to execute steps S520 to S530.

In step S520, from the main memory 130, one executable file 140 is loaded into the application code area 430 based on the running sequence, and one corresponding call information 150 is loaded into the stack area 410. Thereafter, in step S525, the executable file 140 loaded into the application code area 430 is executed based on the call information 150 loaded into the stack area 410. Thereafter, in step S530, it is determined whether the running of all executable files 140 in the main memory 130 is finished. If the running is not completed, return to step S520: another executable file 140 is loaded into the application code area 430 according to the running sequence, and another corresponding call information 150 is loaded into the stack area 410, and so on, until the running of all executable files 140 is finished.

The above steps S520 to S530 are to be described in the following paragraphs in combination with FIG. 2 and FIG. 3. It is assumed that the running sequence of the functions in the target model 230 is function foo1, function foo2, and function foo3.

From the main memory 130, the executable file (including the code segment 140-1 and the data segment 140-4) corresponding to the function foo1 is loaded into the application code area 430 based on the running sequence, and the corresponding call information 150-1 is loaded into the stack area 410. Next, the code segment 140-1 and the data segment 140-4 of the application code area 430 are run based on the call information 150-1 of the stack area 410. After the running of the function foo1 is finished, the executable file (including the code segment 140-2 and the data segment 140-5) corresponding to the function foo2 is loaded into the application code area 430, and the corresponding call information 150-2 is loaded into the stack area 410. Next, the code segment 140-2 and the data segment 140-5 of the application code area 430 are run based on the call information 150-2 of the stack area 410. After the running of the function foo2 is finished, the executable file (including the code segment 140-3 and the data segment 140-6) corresponding to the function foo3 is loaded into the application code area 430, and the corresponding call information 150-3 is loaded into the stack area 410. Next, the code segment 140-3 and the data segment 140-6 of the application code area 430 are run based on the call information 150-3 of the stack area 410.

Besides, in order to improve the efficiency of running, the local memory 120 may be further set to a double buffer architecture, such as a ping-pong buffer architecture.

Figure 5:
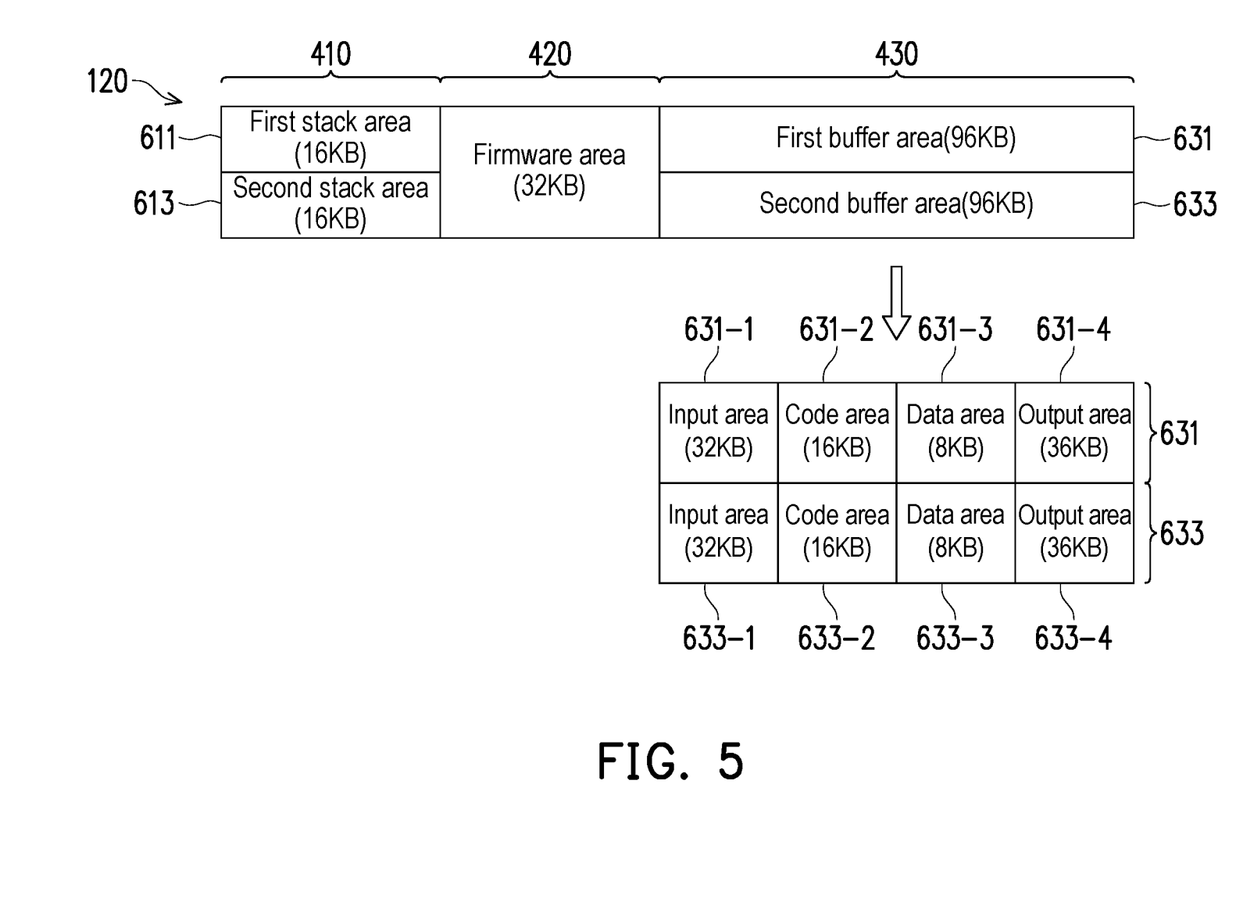
FIG. 5 is an architectural schematic graph of a local memory using a double buffer architecture according to an embodiment of the disclosure.

FIG. 5 is an architectural schematic graph of a local memory using a double buffer architecture according to an embodiment of the disclosure. With reference to FIG. 5, the application code area 430 is divided into a first buffer area 631 and a second buffer area 633, and the stack area 410 is divided into a first stack area 611 and a second stack area 613. The first buffer area 631 includes an input area 631-1, a code area 631-2, a data area 631-3, and an output area 631-4. The second buffer area 633 includes an input area 633-1, a code area 633-2, a data area 633-3, and an output area 633-4. The capacity occupied by each area shown in the embodiment of FIG. 5 is only an example and is not limited thereto.

When the firmware controls the running of the code, first, based on the running sequence of the multiple functions, from the main memory 130, a first executable file (the executable file of the function foo1 that is run first) among the executable files 140 is loaded into the first buffer area 631, and first call information among the call information 150 corresponding to the first executable file is loaded into the first stack area 611. Based on the first call information stored in the first stack area 611, the first executable file stored in the first buffer area 631 is run. During a running period of the first executable file, from the main memory 130, a second executable file (the executable file of the function foo2 that is run second) among the executable files 140 is loaded into the second buffer area 633, and second call information among the call information 150 corresponding to the second executable file is loaded into the second stack area 613. After the running of the first executable file is finished, based on the second call information stored in the second stack area 613, the second executable file stored in the second buffer area 633 is run.

During a running period of the second executable file (the running of the first executable file is finished), from the main memory 130, a third executable file (the executable file of the function foo3 that is run third) among the executable files 140 is loaded and overwritten into the first buffer area 631, and third call information among the call information 150 corresponding to the third executable file is loaded and overwritten into the first stack area 611. After the running of the second executable file is finished, based on the third call information stored in the first stack area 611, the third executable file stored in the first buffer area 631 is run, and so on, until the running of all the executable files 140 is finished.

The access mechanism of the double buffer architecture is described in the following paragraphs in combination with the target model 230 of FIG. 2.

Figure 6A:
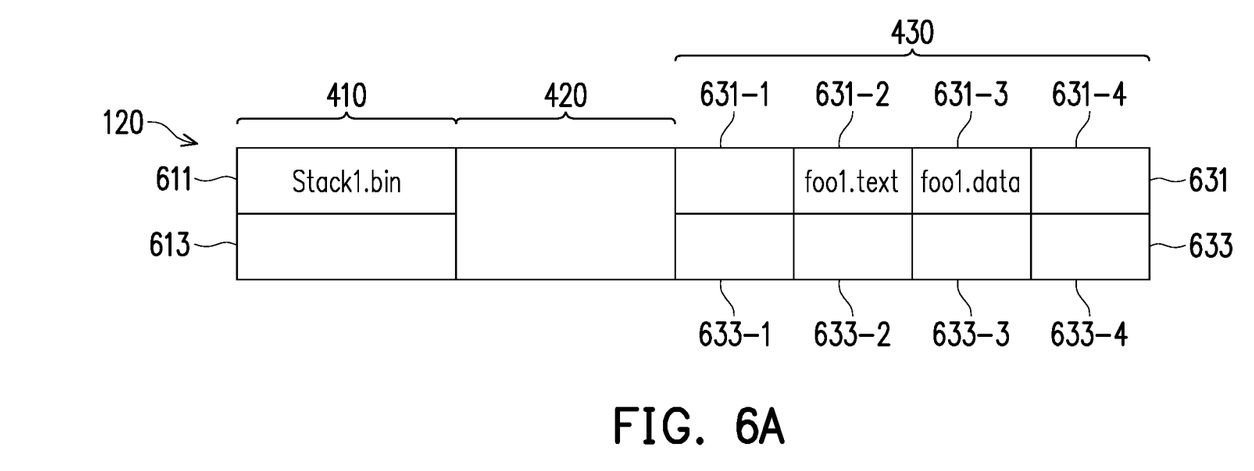
Figure 6B:
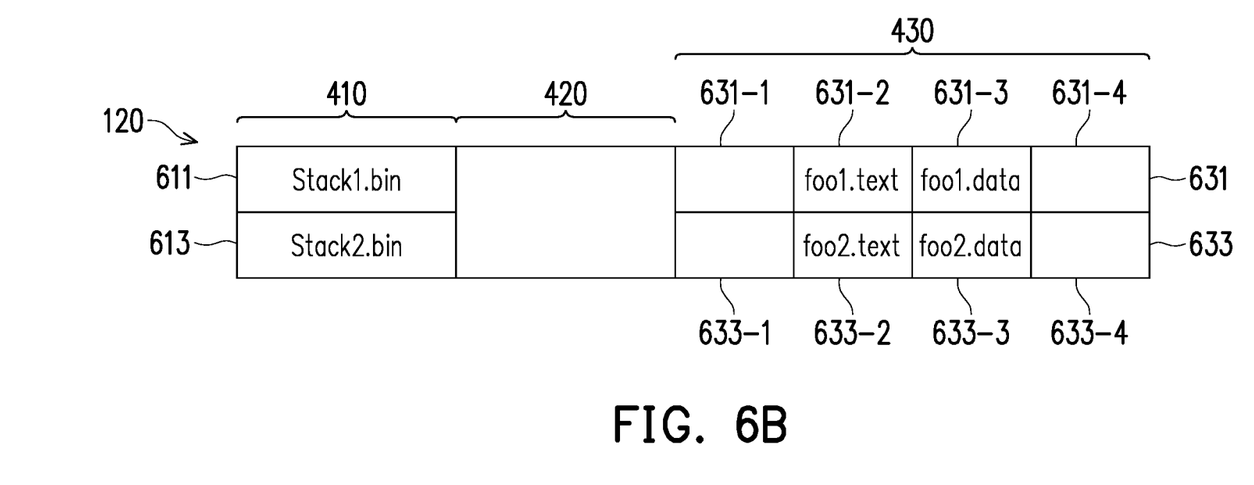
Figure 6C:
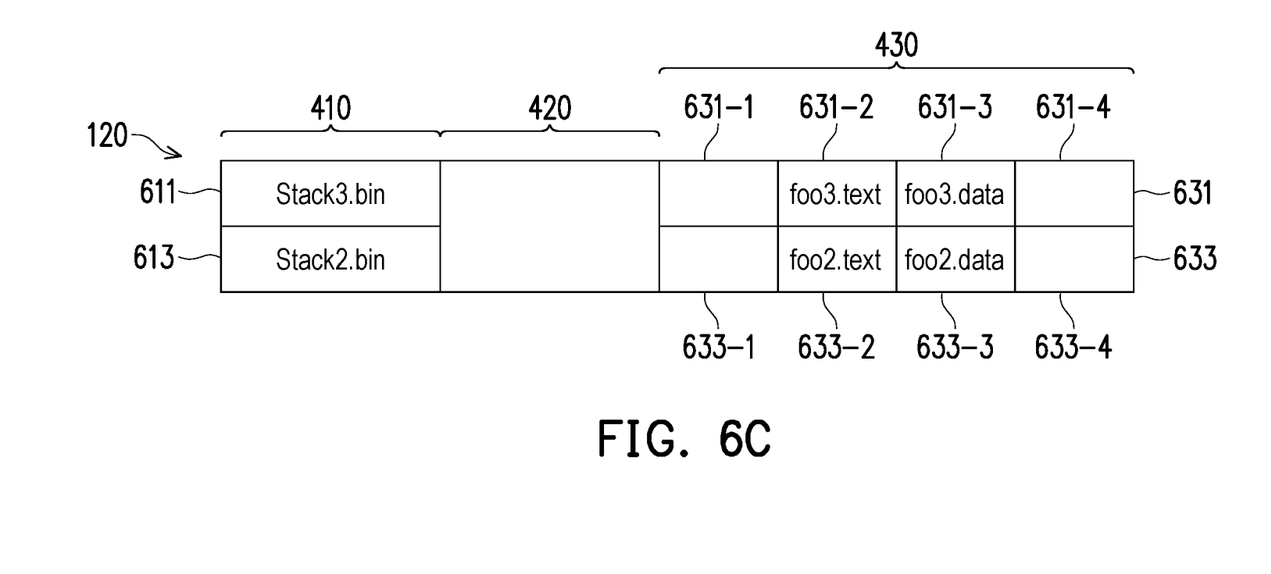
Figure 7:
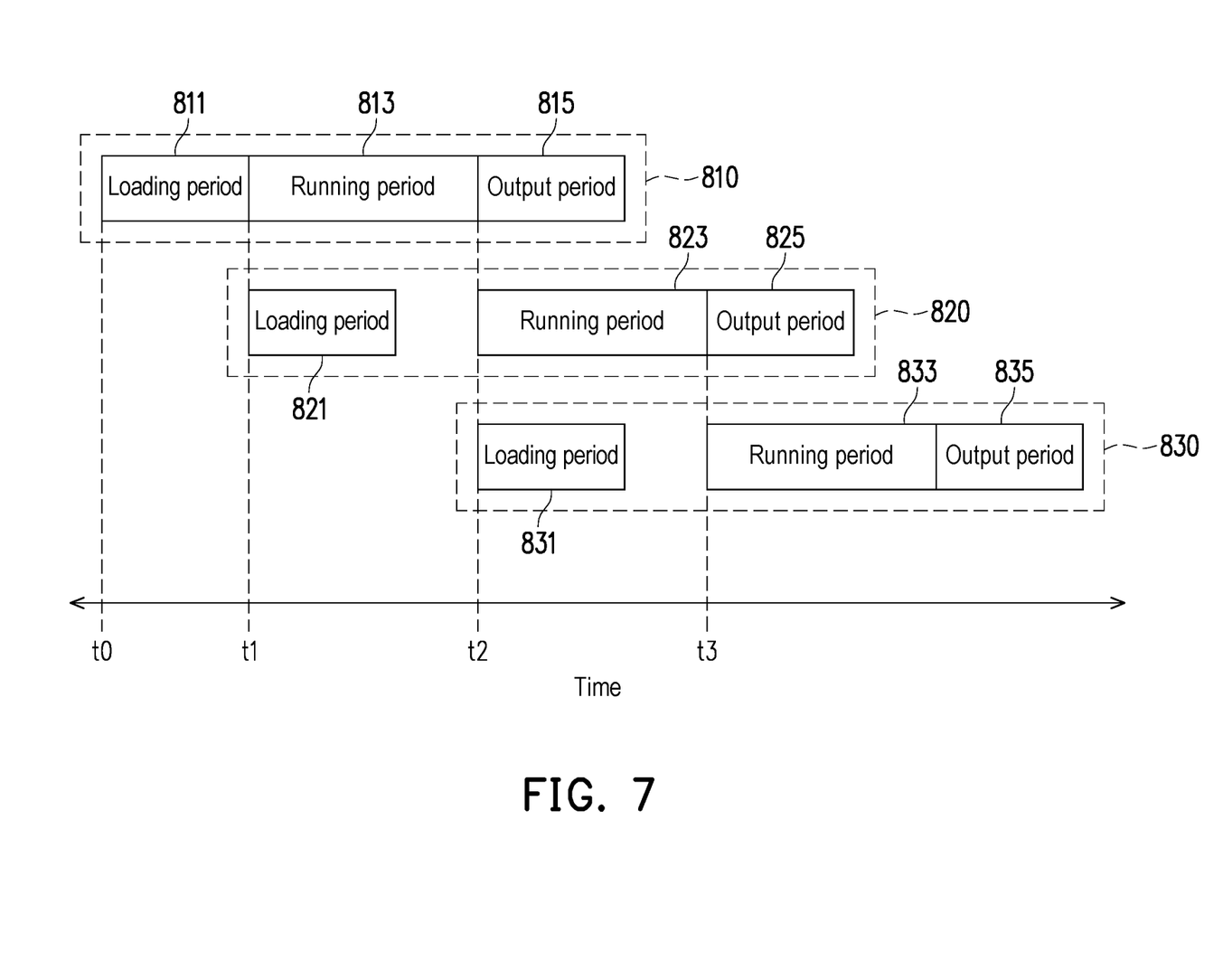
FIG. 7 is a schematic graph of a time sequence under the double buffer architecture according to an embodiment of the disclosure.

FIG. 6A to FIG. 6C are schematic graphs of an access mechanism under the double buffer architecture according to an embodiment of the disclosure. FIG. 7 is a schematic graph of a time sequence under the double buffer architecture according to an embodiment of the disclosure.

FIG. 6A illustrates a loading period 811 of data corresponding to the function foo1, FIG. 6B illustrates a loading period 821 of data corresponding to the function foo2, and FIG. 6C illustrates a loading period 831 of data corresponding to the function foo3. FIG. 7 illustrates time periods 810 to 830 of the function foo1, the function foo2, and the function foo3. The time periods 810 to 830 of the functions include the loading periods (811, 821, and 831), running periods (813, 823, and 833) and output periods (815, 825, and 835). During the loading periods (811, 821, and 831), the firmware in the firmware area 420 loads the instruction and data in the main memory 130 into the local memory 120. During the running periods (813, 823, and 833), the firmware in the firmware area 420 runs the instruction and data in the local memory 120. During the output periods (815, 825, and 835), the firmware in the firmware area 420 transfers the output (running result) obtained during the running from the local memory 120 to the main memory 130.

To be specific, before the firmware runs the function foo1, that is, during the loading period 811 (time t0 to t1) of the function foo1, the relevant data in the main memory 130 is loaded into the local memory 120 first. As shown in FIG. 6A, from the main memory 130, the code segment 140-1 (foo1.text) and the data segment 140-4 (foo1.data) corresponding to the function foo1 are loaded into the code area 631-2 and the data area 631-3 of the first buffer area 631 respectively, and the call information 150-1 (Stack1.bin) corresponding to the function foo1 is loaded into the first stack area 611. Thereafter, the running period 813 (time t1 to t2) is entered, and the firmware runs the function foo1. After the running of the function foo1 is finished, the output period 815 is entered, and the output obtained by the running of function foo1 is transferred from the output area 631-4 of the first buffer area 631 to the main memory 130.

During the running period 813 of running the function foo1 (time t1 to t2), the loading period 821 of the function foo2 is entered. As shown in FIG. 6B, from the main memory 130, the code segment 140-2 (foo2.text) and the data segment 140-5 (foo2.data) corresponding to the function foo2 are loaded into the code area 633-2 and the data area 633-3 of the second buffer area 633 respectively, and the call information 150-2 (Stack2.bin) corresponding to the function foo2 is loaded into the second stack area 613. Thereafter, after the running of the function foo1 is finished, the running period 823 of the function foo2 is entered (time t2 to t3), and the firmware runs the function foo2. After the function foo2 is finished running, the output period 825 is entered, and the output obtained by the running of function foo2 is transferred from the output area 633-4 of the second buffer area 633 to the main memory 130.

During the running period 823 of running the function foo2, the loading period 831 of the function foo3 is entered. As shown in FIG. 6C, from the main memory 130, the code segment 140-3 (foo3.text) and the data segment 140-6 (foo3.data) corresponding to the function foo3 are loaded and overwritten into the code area 631-2 and the data area 631-3 of the first buffer area 631 respectively, and the call information 150-3 (Stack3.bin) corresponding to the function foo3 is loaded and overwritten into the first stack area 611. Thereafter, after the running of the function foo2 is finished, the running period 833 of the function foo3 is entered, and the firmware runs the function foo3. After the running of the function foo3 is finished, the output period 835 is entered, and the output obtained by the running of function foo3 is transferred from the output area 631-4 of the first buffer area 631 to the main memory 130. The rest may be deduced by analogy, until the running of all the functions is finished.

It can be known from FIG. 7 that the relevant data of function foo2 may be downloaded to the local memory 120 when the function foo1 is run. While the output of the function foo1 is transferred to the main memory 130, the function foo2 may be run, and the relevant data of the function foo3 may be downloaded to the local memory 120.

In view of the foregoing, in the disclosure, the code segments and the data segments of the target model may be flexibly placed on the local memory in the data processing device without limiting the software/hardware scale. Further, through the above method, complex operators may be processed. Besides, under the double buffer architecture, during a running period of the current function, the relevant data of the next function may be loaded into the local memory in advance, and the next function may be run when the current function is outputted. In this way, considerable runtime is saved, and the problem of latency may be further addressed.

Finally, it is worth noting that the foregoing embodiments are merely described to illustrate the technical means of the disclosure and should not be construed as limitations of the disclosure. Even though the foregoing embodiments are referenced to provide detailed description of the disclosure, people having ordinary skill in the art should understand that various modifications and variations can be made to the technical means in the disclosed embodiments, or equivalent replacements may be made for part or all of the technical features; nevertheless, it is intended that the modifications, variations, and replacements shall not make the nature of the technical means to depart from the scope of the technical means of the embodiments of the disclosure.

What is claimed is:

1. A code execution method, comprising: storing, through a data processing device, a plurality of executable files corresponding to a plurality of functions and a plurality of call information obtained by parsing a target model through a compiler in a host computer into a main memory, wherein the data processing device comprises the main memory and a local memory, and the local memory comprises an application code area and a stack area, the application code area is divided into a first buffer area and a second buffer area, and the stack area is divided into a first stack area and a second stack area; and
running, through the data processing device, the target model, comprising:
based on a running sequence of the plurality of functions, loading a first executable file among the plurality of executable files from the main memory into the first buffer area and loading first call information among the plurality of call information corresponding to the first executable file into the first stack area;
running the first executable file stored in the first buffer area based on the first call information stored in the first stack area, and during a period of running the first executable file, loading a second executable file among the plurality of executable files from the main memory into the second buffer area, and loading second call information among the plurality of call information corresponding to the second executable file into the second stack area; and
running the second executable file stored in the second buffer area based on the second call information stored in the second stack area after the running of the first executable file is finished; and
transferring a running result from the local memory to the main memory after running of all the executable files of the application code area is completed.

2. The code execution method according to claim 1, wherein the running, through the data processing device, the target model, further comprises:
during a period of running the second executable file, loading and overwriting a third executable file among the plurality of executable files from the main memory into the first buffer area and loading and overwriting third call information among the plurality of call information corresponding to the third executable file into the first stack area; and
running the third executable file stored in the first buffer area based on the third call information stored in the first stack area after the running of the second executable file is finished.

3. The code execution method according to claim 1, wherein the local memory further comprises a firmware area for storing firmware,
step of running the executable file loaded into the application code area based on the call information loaded into the stack area comprises:
running, through the firmware, the executable file loaded into the application code area based on the call information loaded into the stack area.

4. The code execution method according to claim 3, wherein the firmware is a dynamic overlay manager, and
before the step of running, through the data processing device, the target model, the method further comprises:
loading the dynamic overlay manager into the firmware area.

5. The code execution method according to claim 3, wherein the step of running, through the data processing device, the target model, further comprises:
loading, through a first direct memory access engine provided to the firmware, the executable file and the call information from the main memory to the local memory; and
transferring, through a second direct memory access engine provided to the firmware, the running result from the local memory to the main memory.

6. The code execution method according to claim 1, wherein the target model is an artificial intelligence model, each of the executable files comprises a code segment and a data segment corresponding to each of the functions, and each of the call information comprises a call variable corresponding to each code segment.

7. A data processing device, comprising:
a main memory, configured to store a plurality of executable files corresponding to a plurality of functions and a plurality of call information obtained by parsing a target model through a compiler in a host computer;
a local memory comprising a stack area and an application code area, wherein the application code area is divided into a first buffer area and a second buffer area, and the stack area is divided into a first stack area and a second stack area; and
a processor,
wherein the processor is configured to:
based on a running sequence of the plurality of functions, load a first executable file among the plurality of executable files from the main memory into the first buffer area and load first call information among the plurality of call information corresponding to the first executable file into the first stack area,
run the first executable file stored in the first buffer area based on the first call information stored in the first stack area, and during a running period of the first executable file, load a second executable file among the plurality of executable files from the main memory into the second buffer area, and load second call information among the plurality of call information corresponding to the second executable file into the second stack area, and
run the second executable file stored in the second buffer area based on the second call information stored in the second stack area after the running of the first executable file is finished; and transfer a running result from the local memory to the main memory after running of all the executable files of the application code area is completed.

8. The data processing device according to claim 7, wherein the processor is configured to:

during a running period of the second executable file, load and overwrite a third executable file among the plurality of executable files from the main memory into the first buffer area and loading and overwrite third call information among the plurality of call information corresponding to the third executable file into the first stack area, and run the third executable file stored in the first buffer area based on the third call information stored in the first stack area after the running of the second executable file is finished.

9. The data processing device according to claim 7, wherein the local memory further comprises a firmware area for storing firmware, the processor is configured to run, through the firmware, the executable file loaded into the application code area based on the call information loaded into the stack area.

10. The data processing device according to claim 9, wherein the firmware is a dynamic overlay manager, and the data processing device is configured to load the dynamic overlay manager into the firmware area before running the target model.

11. The data processing device according to claim 9, wherein the data processing device loads, through a first direct memory access engine provided to the firmware, the executable file and the call information from the main memory to the local memory, and the data processing device transfers, through a second direct memory access engine provided to the firmware, the running result from the local memory to the main memory.

12. The data processing device according to claim 7, wherein the target model is an artificial intelligence model, each of the executable files comprises a code segment and a data segment corresponding to each of the function, and each of the call information comprises a call variable corresponding to each code segment.

13. A data processing system, comprising:

a host computer obtaining a plurality of executable files corresponding to a plurality of functions and a plurality of call information by parsing a target model through a compiler; and a data processing device, comprising:

a main memory storing the plurality of executable files and the plurality of call information received from the host computer;

a local memory comprising a stack area and an application code area, wherein the application code area is divided into a first buffer area and a second buffer area, and the stack area is divided into a first stack area and a second stack area; and a processor, the processor is configured to:

based on a running sequence of the plurality of functions, load a first executable file among the plurality of executable files from the main memory into the first buffer area and load first call information among the plurality of call information corresponding to the first executable file into the first stack area, run the first executable file stored in the first buffer area based on the first call information stored in the first stack area, and during a running period of the first executable file, load a second executable file among the plurality of executable files from the main memory into the second buffer area, and load second call information among the plurality of call information corresponding to the second executable file into the second stack area, and run the second executable file stored in the second buffer area based on the second call information stored in the second stack area after the running of the first executable file is finished; and transfer a running result from the local memory to the main memory after running of all the executable file of the application code area is completed.

* * * * *